March 27, 1945.    H. E. ANGOLD ET AL    2,372,633
REMOTE CONTROL SPEED INDICATOR
Filed Jan. 13, 1943    4 Sheets-Sheet 2

Inventor
H. E. Angold
E. B. Angold
by
W. E. Evans
Attorney.

March 27, 1945.  H. E. ANGOLD ET AL  2,372,633
REMOTE CONTROL SPEED INDICATOR
Filed Jan. 13, 1943    4 Sheets-Sheet 3

Inventors
H. E. Angold
E. B. Angold
by
W. E. Evans
Attorney.

March 27, 1945.  H. E. ANGOLD ET AL  2,372,633
REMOTE CONTROL SPEED INDICATOR
Filed Jan. 13, 1943  4 Sheets-Sheet 4
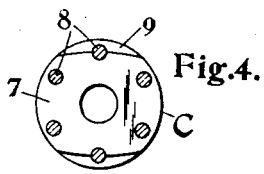
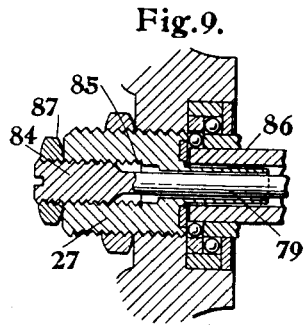
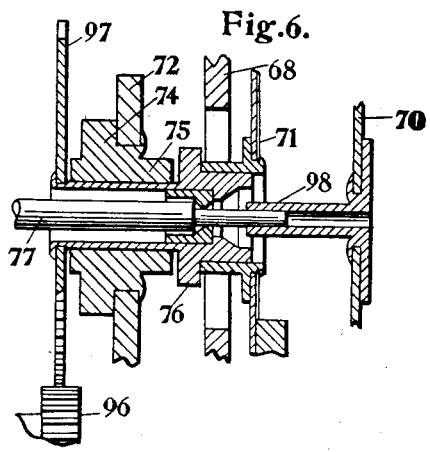
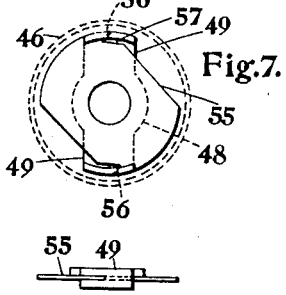
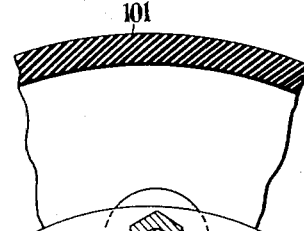
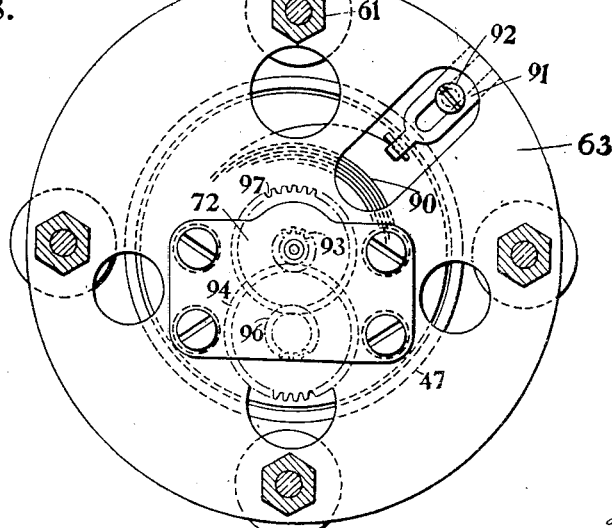
Inventors
H. E. Angold
E. B. Angold
by
W. E. Evans
Attorney.

Patented Mar. 27, 1945

2,372,633

UNITED STATES PATENT OFFICE 2,372,633

REMOTE-CONTROL SPEED INDICATOR

Herbert Edward Angold and Edward Barnabas Angold, London S. W. 16, England

Application January 13, 1943, Serial No. 472,294
In Great Britain January 12, 1942

13 Claims. (Cl. 172—245)

This invention relates to engine and like speed indicators provided with means for remote control and while of general application it is more particularly applicable for use on aircraft where the operating conditions, such as temperature conditions, under which the indicator is required to be effective are extreme.

The invention relates to speed indicators of the kind in which a rotary element is driven in synchronism with or directly by a shaft of the engine or the like the speed of which is to be indicated and serves for the operation of a rotatable magnet the field of which is caused to be effective to act against the action of a spring upon a drag element by which pointers or the like for indicating the speed are operated. For remote control of the indicator the rotary element may comprise the rotor of a synchronous motor that is supplied with current from an electric generator driven by the said shaft of the engine or the like directly or indirectly.

The invention has among its objects to provide an improved and simplified construction of such a speed indicator, to improve the qualities of the indicator as regards its resistance to the effects of extremes of temperature and to provide an indicator that is substantially dead-beat in the indications which it gives.

According to the invention the shaft of the rotor is provided to be hollow and to serve for the reception therein of the spindle of the drag element or a bearing for the said spindle.

According to the invention, moreover, the bearing for the spindle of the drag element may extend axially within the shaft of the rotor and be supported at the end opposite to that with which the spindle of the drag element is engaged. It may be so mounted that it may be adjusted axially for the purpose of determining the extent of freedom to rotate of the spindle of the drag element. For this purpose the bearing may comprise a rod-like element that is slidably mounted in a sleeve adapted for a universal movement in a clamping or gripping device that is in fixed relation to the outer bearing of the spindle of the rotor, the said sleeve being split or otherwise provided to clamp the rod-like element when compressed by a clamping nut or the like. Alternatively the bearing may be provided merely as a rod-like element that at the outer end is screw-threaded to engage the screw-threaded bore of an element of fixed position, such as a plug retaining the outer bearing of the rotor spindle in position in the frame of the motor, the rod-like bearing or element being secured in its adjusted position by a lock nut or the like.

According to the invention, moreover, in order that the self-heating of the motor may not render more severe the extreme heat conditions under which the indicator may be required to function, the motor is separated from the rotatable magnet of the drag element by a massive partition of a material that is relatively a non-conductor of heat and that may form the end wall of the casing of the motor at the end at which is disposed the rotatable magnet.

According to the invention, moreover, the rotatable magnet is protected against the effects of the conduction of heat by the rotor shaft from the rotor by the inter-position of a protecting body of non-conducting material that may be in the form of a supporting sleeve for the magnet or in some other form such as an intermediate section of the rotor shaft.

The drag element is provided in known manner to be operated against the increasing force exerted by a coiled spring but according to the invention the spring is anchored to the drag element or the spindle of the drag element at the inner end and to a fixed element of the frame or casing at the outer end in such manner that when the drag element is moved under the effect of the field of the rotatable magnet the coiled spring is expanded. It is thus possible to ensure that no inaccuracy in the indication of the speed arises from the contacting of convolutions of the spring, even when the drag element is turned through a number of revolutions.

The spindle of the drag element is advantageously provided directly to operate an index or pointer and indirectly to operate a second index or pointer through a reduction gearing whereby the scale of the indicator may be provided to cover a wide range of indication.

The invention further comprises the constructional details hereinafter described.

The invention is illustrated by way of example in the accompanying drawings.

Figure 4 is a cross-section of the rotor, taken on the line 4—4 of Figure 1.

Figure 5 is a cross-section taken on the line 5—5 of Figure 1.

Figure 6 is a detailed axial section of the gearing between the pointers of the indicator, to an enlarged scale.

Figures 7 and 8 are respectively a front elevation and a side elevation of parts of the magnet system.

Figure 9 is a view in axial section of a modification of construction in the mounting of the bearing of the spindle of the drag element.

Figure 1:
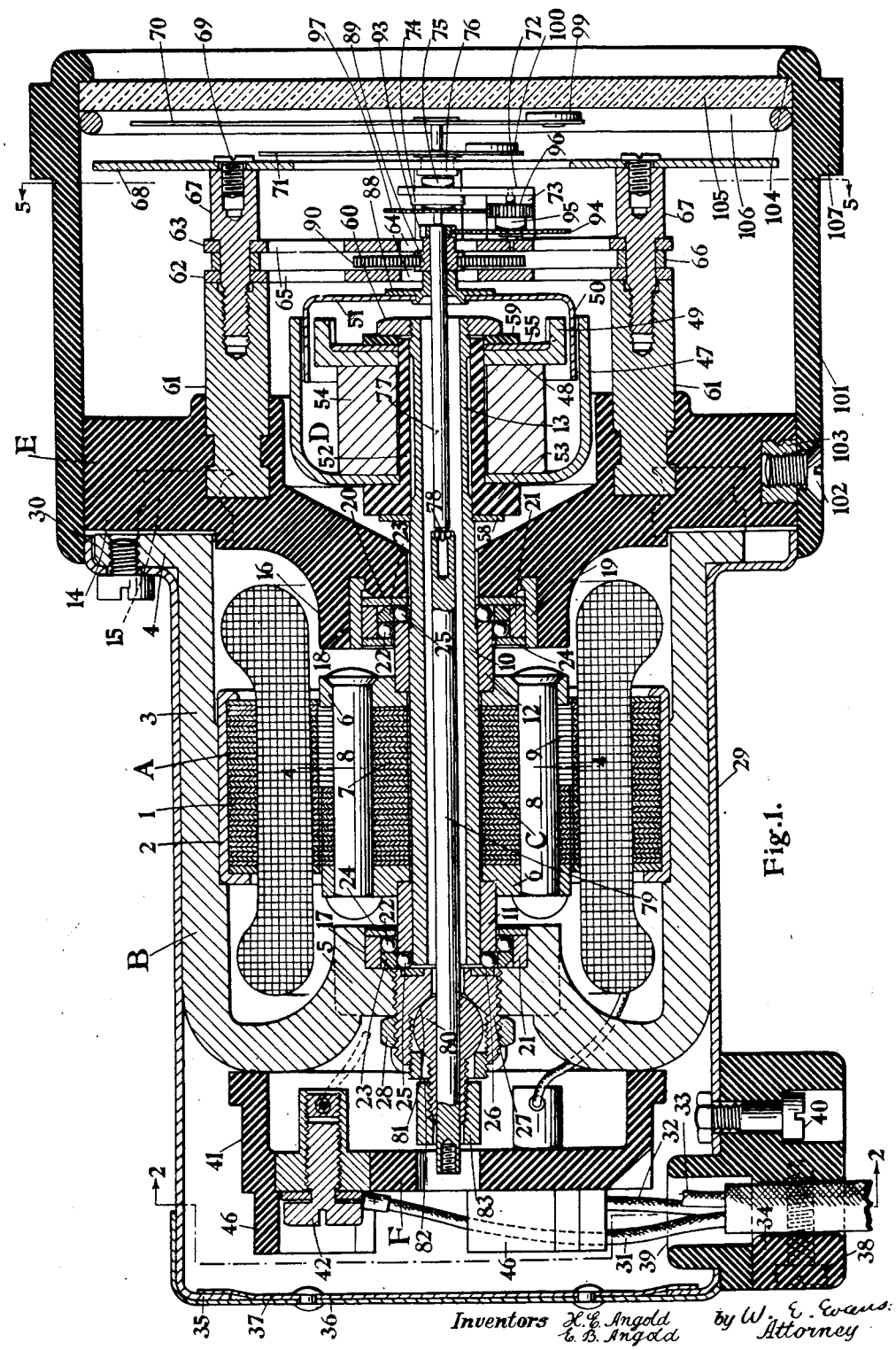
Figure 1 is a longitudinal section through the axis of a construction of speed indicator according to the invention.
Figure 2:
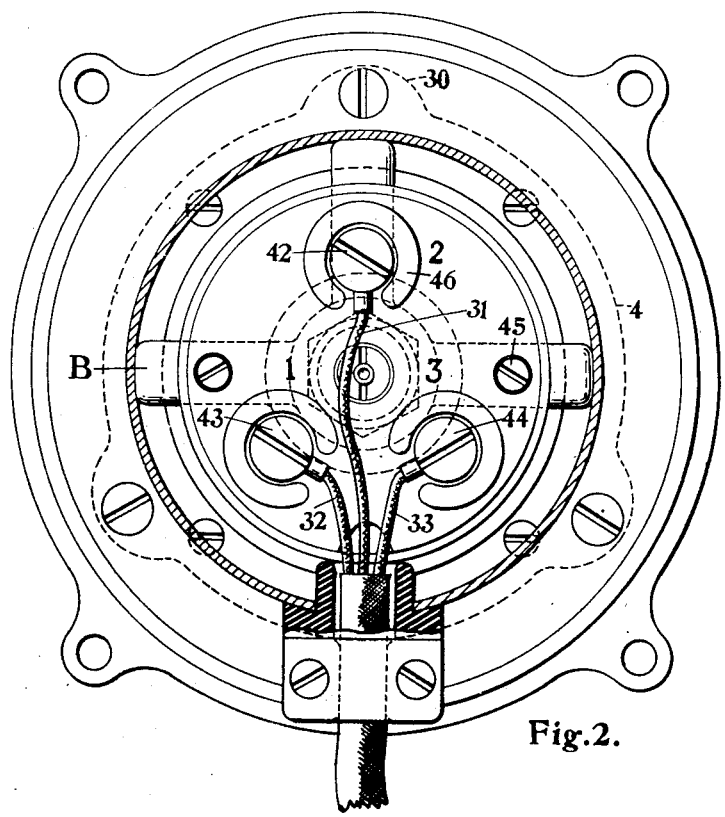
Figure 2 is a rear end elevation, taken on the line 2—2 of Figure 1, the cover of the motor being removed.
Figure 3:
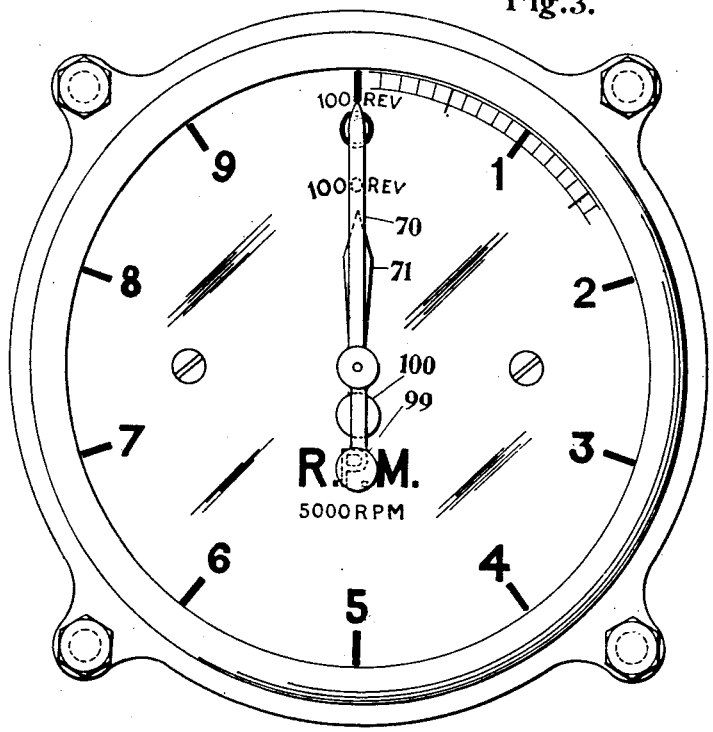
Figure 3 is a front elevation illustrating the dial of the indicator.

In carrying the invention into effect according to the particular construction represented in Figures 1 to 8 of the accompanying drawings, by way of example, a three-phase alternating current generator (not shown) is provided having a rotor directly driven by the shaft of the engine the speed of which is to be indicated, or it may be coupled to the shaft through gearing in such manner as to be synchronous with the engine shaft. The supply leads from the generator are carried to the position of which an indication of the speed of the engine shaft is required to be given and are connected to corresponding terminals of the stator of a synchronous motor, which is thus supplied with the three-phase current from the generator.

The stator A of the three-phase synchronous motor is provided with the annular laminations 1 mounted in a housing or casing 2 in the form of a flanged cylinder of sheet steel or other suitable metal that is flanged at the one end and spun over the laminations at the other end. The said housing or casing is mounted in an aluminium frame B comprising a number of longitudinal bearer members 3 spaced angularly and advantageously connected at the one end to a ring or annulus 4 in the form of an outwardly directed flange and at the other end directed radially inwards and connected to a circular part 5 that is carried forwardly of the radial part of the members 3 along the axis to provide a massive circular annulus or ring the inner face of which approaches the near face of the rotor C.

The rotor is of squirrel-cage type and comprises a pair of spiders or rings 6 of copper or other suitable metal between which are clamped annular laminations 7 by means of a series of spaced rivets 8 extending between the spiders or rings parallel with the axis. As represented in Figures 1 and 4, the laminations 7 for a part of the width of the rotor are cut away transversely on a diameter, as at 9, for the formation of opposed poles that serve to maintain synchronism with the field, the remaining part of the width of the rotor being maintained cylindrical to serve to accelerate the rotor into synchronism.

The rotor is mounted upon a hollow metal shaft 10 at a position determined by collars 11, 12 of extended length disposed one at each side of the rotor and advantageously partly recessed into the spiders or rings 6, the shaft extending a short distance beyond the collar 11 at the one end and being extended beyond the collar 12 at the other end to form a spindle 13 by which the rotatable magnet D is carried.

The outwardly directed flange 4 of the frame B is provided to be received in a shallow seating 14 formed in the lateral face of an annular partition member E of massive form made from a material that is relatively non-heat conducting, such as a thermal-setting or thermo-plastic compound. The said partition member is provided with spaced inset bushes 15 of brass or other metal that are screw-threaded for the reception of the fixing screws by which the flange 4 of the frame B is secured thereto. The partition member E towards the centre is formed with a laterally directed hollow cylindrical or annular part 16 the face of which comes to lie in proximity to the second lateral face of the rotor C, the said cylindrical or annular part being complementary to the central annular part 5 of the frame B. The two said parts 5 and 16 are formed with cylindrical recesses 17, 18, formed in the faces in proximity to the rotor and serving for the reception of thrust and ball bearings for the rotor spindle. The cylindrical recess 18 of the partition member E is advantageously lined with a cylindrical lining 19 of brass or like metal and the bottom of the recess is advantageously lined with a disc or ring 20 of metal, such as steel.

In the formation of each ball bearing there is provided a cylindrical bearing ring 21 of steel that is received into the bottom of the recess 17 of the central part 5 of the frame B or into the bottom of the lined recess 18 of the partition member E and is so disposed that the outer part is concentric with the outer end of the corresponding collar 11 or 12 upon the hollow shaft 10 of the rotor so that the opposing surfaces form rolling surfaces for the balls 22 of the bearing. The said balls are confined laterally at the one side by means of rings 23, of substantially square section, of brass, phosphor bronze or the like, disposed within the bearing rings 21 and at the bottom of the recesses and at the other side by guide rings 24 of rectangular cross-section, of brass, phosphor bronze or the like, that butt against the ends of the bearing rings 21.

The outer ends of the collars 11, 12 upon the rotor shaft 10 form thrust surfaces for thrust balls 25 that contact with complementary surfaces respectively formed by the lining ring 20 at the bottom of the recess 18 of a central part of the partition member and by a thrust ring 26 carried by a plug or sleeve 27 that is screw-threaded upon the exterior and that is engaged in a screw-threaded bore in the central part 5 of the frame B so that the thrust ring 26 is adapted for adjustment to determine the play of the thrust balls 25. The said plug 27 is locked in its position of adjustment by a lock nut 28. The thrust balls 25 are confined between longitudinal surfaces formed respectively upon the rotor shaft 10 and upon the rings 23 before referred to.

The frame B of the motor is advantageously contained within a housing or cover 29 of copper or like heat conducting material that is spun to embrace the outwardly directed flange 4 of the frame B, to which it is screwed by screws engaged in spaced peripheral lugs 30 and at the far end is extended to enclose the terminal fitting F for the conductors 31, 32, 33 of the supply leads and to support a clamping sleeve 34 for the supply leads. The end of the housing 29 is flanged inwardly at 35 and is closed by a flanged cover 36 that advantageously is engaged by means of a bayonet joint device consisting of a strip 37 of sheet metal riveted to the inner side of the cover 36 and having the ends adapted to pass through slots (not shown) in the flange 35 of the housing whereupon the cover 36 may be partially rotated to lock it. The clamping sleeve 34 for the supply leads is advantageously formed in a thermal-setting or thermo-plastic substance and is split or in two parts so that it may be tightened about the leads by means of a clamping screw or screws 38 transversely disposed. The leads pass into the housing 29 by way of a bush-like part 39 of the clamp which projects through the wall of the housing, the clamp being secured to the housing by means of screw bolts 40. The terminal fitting F comprises a cup-like body 41 of thermal-setting or thermo-plastic substance that is recessed to receive the end of the plug 27 of the frame B and to allow of the protrusion of the clamping screws 42, 43, 44 by which the conductors of the leads are engaged. The terminal fitting is provided to be secured to the end of the frame B by screws or bolts 45. The terminal screws 42, 43, 44 are advantageously screened one from the other by screens 46 integrally formed with the body of the fitting.

The partition member E at the side removed from the motor is centrally recessed to receive partially therein the rotatable magnet D. The magnet is formed by a cup-like outer pole member 47 and by an inner pole member 48 having two or more pole arms 49 the faces or shoes of which extend into close proximity with the inner surface of the cup-like member 47 to form therewith pairs of poles and so that there is formed a narrow air gap in which may be disposed the cylindrical part 50 of an aluminium drag element 51 of cup-like form.

As illustrated in Figure 7, the two pole arms 49 are formed as radial extensions of the ring like pole member 48 engaged upon a sleeve 52 of thermal-setting or thermo-plastic substance that has a peripheral flange 53 at the one end forming a shoulder against which the cup-like pole member 47 may butt. The pole members 47 and 48 are spaced apart upon the sleeve by a massive cylinder 54 of an aluminium nickel alloy, while to the exterior of the inner pole member there is disposed a disc-like element 55 made of a temperature-sensitive metal that is formed with radial parts extending into the spaces between the arms 49 of the inner pole member 48, while shoulders 56 formed by angular recesses 57 in the lateral edges of the element 55 are received within slots formed in the pole shoes of the pole member 48 parallel with the surface of the latter.

The sleeve 52 bearing the assembled pole members 47 and 48 is mounted upon the extension 13 of the shaft 10 of the synchronous motor, which extension is slightly reduced in diameter to form the seating for the sleeve, the position of the sleeve being determined by a washer 58 butting against the shoulder formed by the change in diameter of the hollow extension of the rotor shaft. The assembled parts of the magnet are maintained in fixed position upon the spindle by a washer 59 fitting over the outer end of the sleeve and bearing against the outer face of the disc 55 of temperature-sensitive metal, the washer being held in position by a nut 60 screwed upon the end of the hollow shaft extension, which is peripherally screw-threaded for the purpose. In order to avoid as far as possible conduction of heat from the hollow shaft to the sleeve of the magnet the shaft is advantageously peripherally recessed for the middle part of the seating for the sleeve 52.

The partition member E is provided with a number of spaced metal posts 61 positioned parallel with the axis of the hollow shaft 10 and such posts serve for the support of two spaced discs or spiders 62, 63 having axial openings 64 and a concentric series of openings 65 to reduce the weight, the spacing of the discs or spiders 62, 63 being determined by spacing washers 66 and the discs or spiders 62, 63 and the washers 66 being maintained in position upon the posts 61 by securing screws 67 that are provided with elongated hexagonal or like heads forming posts for the support of a circular dial plate 68 that is held in position by retaining screws 69 adapted to screw into screwed bores formed in the heads of the screws 67. The dial plate 68 is centrally apertured for the passage of the spindles of two indexes or pointers 70, 71.

Upon the outer disc or spider 63 there is secured a bearing plate 72 disposed parallel with the said disc or spider 63 and extending across the axis of the hollow spindle. The said bearing plate is supported from the disc or spider 63 by spacing columns 73 and is provided with a bearing bush 74 in which is mounted a hollow spindle 75 having the forward part protruding through the central aperture in the dial plate 68 and having a peripheral flange 76 to determine the position of the boss or sleeve of the short index or pointer 71 that lies in proximity to the dial plate 68. The hollow spindle 75 is provided in the bore with a seating or a jewel bearing that serves to support the journal of a spindle 77 for the drag element that extends through the bore of the hollow shaft extension 13 to a position adjacent the front face of the partition member E.

A seating or jewel bearing 78 for the rear end of the spindle 77 is carried at the forward end of a rod-like element 79 that at the rear end is mounted in a bearing sleeve 80 that for a part of its length is of spherical form and for the remainder of its length is cylindrical and provided with a screw-threaded periphery, the cylindrical part being split. The spherical part of the sleeve 80 is received within the plug or sleeve 27 by which the rear ball bearing of the rotor is confined. The spherical part of the sleeve 80 is clamped between a conical face 81 formed at the bottom of the recess in the plug 27 in which the sleeve 80 is received and a clamping ring 82 that is screw-threaded on the periphery to engage the screw-threaded wall of the recess of the plug 27. The screw-threaded part of the sleeve 80 is adapted to receive a clamping nut 83 having the thread formed with a slight taper so that as the nut is screwed upon the bearing sleeve, the split part of the sleeve is compressed upon the rod-like bearing element 79. Thus, in setting up the spindle 77 of the drag element 51 it is possible to effect any required radial adjustment of the seating or jewel bearing 78 and at the same time any axial adjustment that may be required to give the necessary freedom of rotation to the spindle 77 of the drag element.

Figure 8 illustrates a modification of construction of the mounting of the rod-like bearing element 79 of the spindle 77 in which the element has at the outer end a cylindrical head 84 that is peripherally screw-threaded to be received into a screw-threaded bore 85 of the plug or sleeve 27 retaining the rear ball bearing of the rotor. The said plug or sleeve advantageously has a cylindrical extension 86 disposed within the hollow spindle 10 of the rotor. The rod-like bearing element is locked in its adjusted axial position by means of a lock nut 87 screwed to the outer end of the head. The head 84 may be slotted for rotation by a screw driver that may be entered into the slot through a central opening formed in the terminal fitting F.

The cupped disc 50 forming the drag element is mounted upon a boss 88 having a peripheral flange for the support of the drag element, the boss being fixedly mounted at a position immediately in proximity to the inner spacing disc or spider 62 upon the spindle 77. A second boss 89 is fitted to the spindle 77 on the outer side of the drag element 50 in a position such that a part of it lies in the same plane normal to the axis as the spacing washers 66. The boss 89 (Figures 1 and 5) has fixedly mounted upon it the inner end of a spiral spring 90 disposed between the discs or spiders 62, 63 and the outer end of which is anchored by means of a fork-like fitting 91 to a suitable pin 92 mounted in one or other of the discs or spiders 62, 63. The direction of the convolutions of the spring is such that in the operation of the drag element 50 the spring tends to unwind.

The spindle 77 of the drag element 50 further carries adjacent the outer disc or spider 63 a pinion 93 that is in engagement with a tooth wheel 94 that is provided fixedly mounted upon a boss-like element 95 having bearing journals that are received respectively in bearing holes formed in the outer disc or spider 63 and in the bracket plate 72. The said element is further formed or provided with a pinion 96 that is in engagement with a tooth wheel 97 (Figure 6) fixedly mounted on the hollow spindle 75 of the short index or pointer 71 at the inner side of the bearing bush 74 for the said spindle 75 so that the rotation of the spindle of the drag element is transmitted through the said pinions and toothed wheels as through a reduction gear to the said index or pointer 71, while the journal of the spindle 77 extending through the jewel or like bearing of the spindle 75 serves to support the boss 98 of the long index or pointer 70 that is thus directly operated by the drag element 50.

Each of the pointers 70, 71 is advantageously counter-weighted as at 99 and 100 and coated with luminescent material.

The partition member E together with the parts carried therefrom, including the dial 68 and the indexes or pointers 70, 71 is enclosed within a casing 101 in the form of a cylinder of thermal-setting or thermoplastic material that is secured to the partition member E by screws 102 engaging nuts 103 set in the body of the partition member and provided at the forward end with a seating 104 for a glass or like transparent cover plate 105 that may be retained in position by an annular spring retainer 106. The casing 101 may be provided towards the forward end with a peripheral collar 107 whereby it may be readily seated in the instrument board.

We claim:

1. A remote speed indicator in which the rotor of a synchronous electric motor drives a rotatable magnet system which rotates, against the action of a spring, a drag element coupled to a pointer, comprising a casing for the magnet system and the drag element, a hollow shaft upon which the said magnet system is mounted, the said shaft extending outwardly from the casing to receive the rotor of the motor, a spindle for the drag element co-axial with the said shaft, spaced bearings in fixed relation to the casing in which the said spindle is supported, a spiral spring anchored at the inner end in fixed relation to the drag element spindle in the disposition to be uncoiled on rotation of the drag element by the magnet system, spaced discs disposed one at each side of the spiral spring in fixed relation to the casing, the outer end of the spring being anchored in fixed relation to the discs, a dial plate supported from the discs and a pointer supported upon the said spindle, a hollow spindle concentric with the spindle of the drag element, a second pointer supported by the said hollow spindle and a train of gear coupling the spindle of the drag element with the hollow spindle.

2. A remote speed indicator in which the rotor of a synchronous electric motor drives a rotatable magnet system which rotates, against the action of a spring, a drag element coupled to a pointer, comprising an enclosure within which the stator of the motor is fixedly mounted, a massive partition member of non-heat-conducting material forming one end wall of the enclosure, a hollow shaft supporting the rotor of the motor and extending through the partition member, bearings respectively at the two ends of the enclosure for the said hollow shaft, the hollow shaft supporting the rotatable magnet system exterior to the enclosure and in proximity to the partition member, the spindle supporting a drag element and disposed co-axially with the hollow shaft, bearings co-axial with the hollow shaft and in fixed relation to the enclosure for the support of the said spindle, the spring being a spiral spring having one end in fixed relation to the enclosure and the other end in fixed relation to the drag element, the said spring opposing the rotation of the drag element, a dial plate in fixed relation to the enclosure, at least one pointer rotated from the drag element to indicate the speed upon the dial plate and means to supply current to the motor to rotate the rotor.

3. A remote control speed indicator in which the rotor of a synchronous electric motor drives a rotatable magnet system which rotates, against the action of a spring, a drag element coupled to a pointer, comprising a casing for the magnet system and the drag element, a hollow shaft extending through the rear wall of the casing and supporting the rotor and magnet system, a co-axial spindle extending into the hollow shaft and supporting the drag element and having anchored to it the inner end of a spiral spring, a bearing element of fixed position co-axial with the hollow shaft, a support for the bearing element carried by and exterior to the casing and spaced bearings for the spindle respectively supported in fixed relation from and within the casing and by the bearing element.

4. A remote control speed indicator in which the rotor of a synchronous electric motor drives a rotatable magnet system which rotates, against the action of a spring, a drag element coupled to a pointer, comprising a casing for the magnet system and the drag element, a hollow shaft extending through the rear wall of the casing and supporting the rotor and magnet system, a co-axial spindle extending into the hollow shaft and supporting the drag element and having anchored to it the inner end of a spiral spring, a bearing element of fixed position co-axial with the hollow shaft, a support for the bearing element carried by and exterior to the casing and spaced bearings for the spindle respectively supported in fixed relation from and within the casing and by the bearing element, the spiral spring being anchored at the outer end in fixed relation to the casing in the disposition to be uncoiled on rotation of the drag element by the magnet system.

5. A remote control speed indicator in which the rotor of a synchronous electric motor drives a rotatable magnet system which rotates, against the action of a spring, a drag element coupled to a pointer, comprising a casing for the magnet system and the drag element, a hollow shaft extending through the rear wall of the casing and supporting the rotor and magnet system, a co-axial spindle extending into the hollow shaft and supporting the drag element and having anchored to it the inner end of a spiral spring, a bearing element of fixed position co-axial with the hollow shaft, a support for the bearing element carried by and exterior to the casing, spaced parallel plates in fixed relation to the casing and disposed to the two sides of the spiral spring, one of which plates provides an anchorage for the outer end of the spiral spring, and spaced bearings for the spindle respectively supported from one of the parallel plates and by the bearing element.

6. A remote control speed indicator in which the rotor of a synchronous electric motor drives a rotatable magnet system which rotates, against the action of a spring, a drag element coupled to a pointer, comprising a casing for the magnet system and the drag element, a hollow shaft extending through the rear wall of the casing and supporting the rotor and magnet system, a carrier for the stator of the motor mounted upon the rear wall of the casing, bearings for the hollow shaft supported respectively by the rear wall of the casing and the carrier, a bearing element of fixed position disposed co-axially within the said shaft, a mounting sleeve of fixed position and an adjustable ring element together forming a clamp for a head of spherical form on the bearing element, the said mounting sleeve being supported by the carrier, a drag element supporting spindle extending co-axially into the hollow shaft and subject to the action of a spiral spring and spaced bearings for the said spindle respectively supported in fixed relation to the rear wall of the casing and by the bearing element.

7. A remote control speed indicator in which the rotor of a synchronous electric motor drives a rotatable magnet system which rotates, against the action of a spring, a drag element coupled to a pointer, comprising a casing for the magnet system and the drag element, a hollow shaft extending through the rear wall of the casing and supporting the rotor and magnet system, a carrier for the stator of the motor mounted upon the rear wall of the casing, bearings for the hollow shaft supported respectively by the rear wall of the casing and the carrier, a bearing element of fixed position disposed co-axially within the said shaft, a sleeve upon the said bearing element having a spherical head and a screw-threaded periphery, the said sleeve being split, a clamping nut with tapered and screw-threaded bore for clamping the sleeve upon the bearing element, a mounting sleeve of fixed position and an adjustable ring element together forming a clamp for the head of the sleeve upon the bearing element, the said mounting sleeve being supported by the carrier, a drag element supporting spindle extending co-axially into the hollow shaft and subject to the action of a spiral spring and spaced bearings for the said spindle respectively supported in fixed relation to the rear wall of the casing and by the bearing element.

8. A remote control speed indicator in which the rotor of a synchronous electric motor drives a rotatable magnet system which rotates, against the action of a spring, a drag element coupled to a pointer, comprising a casing for the magnet system and the drag element, a hollow shaft extending through the rear wall of the casing and supporting the rotor and magnet system, a carrier for the stator of the motor mounted upon the rear wall of the casing, bearings for the hollow shaft supported respectively by the rear wall of the casing and the carrier, a bearing element of fixed position disposed co-axially within the said shaft, the said bearing element having at the one end a peripherally screw-threaded head, a mounting sleeve of fixed position supported by the carrier and having a screw-threaded bore with which the head of the bearing element engages so that the bearing element is concentric with the sleeve, a lock nut upon the head of the bearing element, a drag element supporting spindle extending into the hollow shaft and subject to the action of a spiral spring and spaced bearings for the said spindle respectively supported in fixed relation to the rear wall of the casing and by the bearing element.

9. A remote control speed indicator in which the rotor of a synchronous electric motor drives a rotatable magnet system which rotates, against the action of a spring, a drag element coupled to a pointer, comprising a casing for the magnet system and the drag element having a rear wall of non-heat-conducting material, a hollow shaft extending through the said wall of the casing and supporting the rotor and magnet system, a co-axial spindle extending into the hollow shaft and supporting the drag element and having anchored to it the inner end of a spiral spring, a bearing element of fixed position co-axial with the hollow shaft and supported exterior to the casing and spaced bearings for the spindle respectively in fixed relation to the casing and to the bearing element.

10. A remote control speed indicator in which the rotor of a synchronous electric motor drives a rotatable magnet system which rotates, against the action of a spring, a drag element coupled to a pointer, comprising a casing for the magnet system and drag element, the said casing having a rear wall of non-heat-conducting material, a hollow shaft extending through the rear wall of the casing and supporting the rotor exterior to the casing, an insulating bearing member supporting the magnet system in fixed relation to the hollow shaft, a co-axial spindle extending into the hollow shaft and supporting the drag element and having anchored to it the inner end of a spiral spring, a bearing element of fixed position co-axial with the hollow shaft and supported exterior to the casing and spaced bearings for the spindle respectively in fixed relation to the casing and to the bearing element.

11. A remote control speed indicator in which the rotor of a synchronous electric motor drives a rotatable magnet system which rotates, against the action of a spring, a drag element coupled to a pointer, comprising a casing for the magnet system and drag element, the said casing having a rear wall of non-heat-conducting material, a hollow shaft extending through the rear wall of the casing and supporting the rotor exterior to the casing, an insulated sleeve supporting the magnet system on the hollow shaft, a co-axial spindle extending into the hollow shaft and supporting the drag element and having anchored to it the inner end of a spiral spring, a bearing element of fixed position co-axial with the hollow shaft and supported exterior to the casing and spaced bearings for the spindle respectively in fixed relation to the casing and the bearing element.

12. A remote control speed indicator in which the rotor of a synchronous electric motor drives a rotatable magnet system which rotates, against the action of a spring, a drag element coupled to a pointer, comprising a casing for the magnet system and drag element, the said casing having a rear wall of non-heat-conducting material, a hollow shaft extending through the rear wall of the casing and supporting the rotor exterior to the casing, an insulated sleeve supporting the magnet system on the hollow shaft the shaft being reduced in diameter to form spaced seatings for the insulating sleeve, a co-axial spindle extending into the hollow shaft and supporting the drag element and anchored to the inner end of a spiral spring, a bearing element of fixed position co-axial with the hollow shaft and supported exterior to the casing and spaced bearings for the spindle respectively in fixed relation to the casing and to the bearing element.

13. A remote control speed indicator in which the rotor of a synchronous electric motor drives a rotatable magnet system which rotates, against the action of a spring, a drag element coupled to a pointer, comprising a mechanism-supporting element, a hollow shaft extending through the said supporting element and supporting the rotor and magnet system at the two sides of the supporting element, a co-axial spindle extending into the hollow shaft and supporting the drag element and having anchored to it the inner end of a spiral spring, a bearing element of fixed position co-axial with the hollow shaft, a carrier for the bearing element mounted upon the supporting element, a bearing-supporting frame also mounted upon the supporting element and spaced bearings for the spindle respectively carried by the bearing element and the supporting frame.

HERBERT EDWARD ANGOLD.
EDWARD BARNABAS ANGOLD.